May 18, 1954 V. E. RAINSFORD 2,678,623
TRANSPARENT TEST PLUG FOR STEAM TRAPS
Filed March 17, 1953
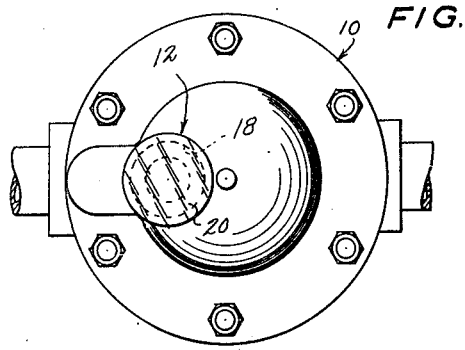
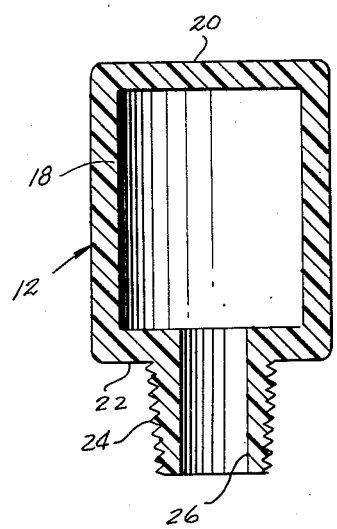
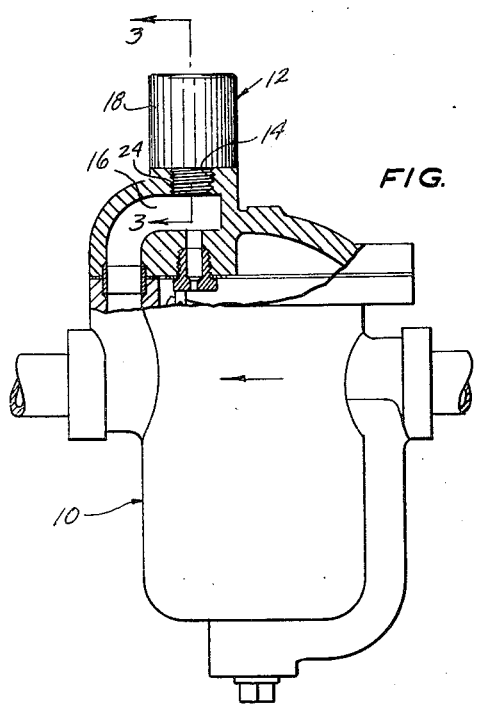
INVENTOR.
VICTOR E. RAINSFORD,
BY
McMorrow, Berman + Davidson
ATTORNEYS Patented May 18, 1954

2,678,623

UNITED STATES PATENT OFFICE 2,678,623

TRANSPARENT TEST PLUG FOR STEAM TRAPS

Victor E. Rainsford, Philadelphia, Pa.

Application March 17, 1953, Serial No. 342,878

1 Claim. (Cl. 116—114)

This invention relates to test plugs for steam traps, and more particularly, has reference to a test plug novelly designed in a manner to permit visual observation of internal conditions within the steam trap, for the purpose of showing whether or not the steam trap is functioning properly.

Ordinarily, a steam trap is provided with a threaded test plug opening, in which is engaged a solidly formed, opaque test plug of metal or the like.

This conventional construction does not permit one to make observation of internal conditions within the steam trap, whenever knowledge of said internal conditions is desirable or necessary.

The main object of the present invention, accordingly, is to provide a transparent test plug adapted to be substituted for the conventional plug regularly provided on steam traps, and adapted, further, to reflect immediately the condition of flow through the trap.

Another important object is to provide a plug as described which is designed to be formed as a single, rigid unit, which unit can be composed either from a single piece of material, of from several pieces assembled to constitute a single, rigid structure.

Yet another object is to provide a plug as stated the particular shape of which is designed to cause the internal conditions within the trap to be reflected in the hollow interior of the plug, where said conditions can be visually observed readily.

A still further object of the invention is to provide a test plug as stated which will be inexpensively formed, can be readily substituted for a conventional test plug not having the advantages noted above, and will not require modification or redesign of a conventional steam trap.

Other objects will appear from the following description, the claim appended thereto, and from the annexed drawing, in which like reference characters designate like parts throughout the several views, and wherein:

Figure 1 is a top plan view of a steam trap equipped with a test plug formed in accordance with the present invention;

Figure 2 is a view of the steam trap partly in side elevation and partly in longitudinal section, the test plug constituting the present invention being illustrated in side elevation; and Figure 3 is a longitudinal sectional view, on an enlarged scale, through the test plug per se, taken on line 3—3 of Figure 2.

A conventional steam trap has been generally designated 10 in the drawing, and since the steam trap does not, per se, constitute part of the present invention, it is not believed necessary to describe in detail the construction thereof. It is sufficient for the purposes of the present application to note that the steam trap is provided, as shown in Figure 2, with a tapering, threaded, test plug opening in which the test plug 12, constituting the present invention, is mounted, said opening being designated by the reference numeral 14. In communication with the opening 14 is a passage through which condensate flows when the trap is in operation.

The test plug, in the illustrated embodiment of the invention, is integrally molded or otherwise formed from a single piece of material, and can be formed of transparent plastic, glass, or the like. As shown in Figure 3, the test plug includes a body having a cylindrical side wall 18 integral, at that end thereof remote from the trap 10, with a closed end wall 20.

At its other end, the body side wall 18 is integral with an end wall 22, said end wall 22 being formed with an axial extension 24 externally tapered and threaded for engagement in the test plug opening 14. The extension 24 has a bore 26 extending axially of the body, said bore communicating at one end with the hollow interior of the body and at its other end with the passage 16.

As will be noted, the extension 24 is reduced in outer diameter relative to the outer diameter of the side wall 18, and there is thus defined a circumferential shoulder on the body, at the base of the extension, which shoulder may engage against the portion of the outer surface of the trap extending about opening 14.

It is to be noted that the body is wholly closed, except for the provision of the tubular extension 24, and it is further to be noted that in the illustrated example, the thickness of the side and end walls of the body is constant, throughout the entire area of said body. However, it is to be understood that possibly, the top wall 20 might be thickened additionally to combat erosion.

In use of the invention, the conventional test plug, not shown, ordinarily provided upon the steam trap 10 is removed, and the plug illustrated in the drawing is substituted therefor. The plug will thus be disposed to permit visual observation of internal conditions within the steam trap.

The plug is distinguished from ordinary flow glasses, etc., since said flow glasses require a through flow condition, either in a transparent conduit, or through a transparent section of a conduit. My visual observation plug, on the other hand, requires that the condensate flow into the body through the tubular extension 24, and then back out of the body through the same extension. There is no through flow.

The "fill and empty" cycle that results from the above described characteristic of the device provides a scrubbing action, which tends to clean the unit, thereby to permit clear vision of the internal conditions within the trap at all times.

It is to be noted that as shown in the drawing, the plug can be installed above the discharge orifice of the trap. Of course, under certain conditions, the plug might be installed elsewhere, and except as necessarily required by the scope of the appended claim, I do not desire to limit myself to an arrangement wherein the plug is mounted above the discharge orifice.

It is also thought to be an important characteristic of the invention that there are no moving parts in my device, and the device can be readily formed as a single, integral article. In some circumstances, the plug might be formed from a plurality of rigidly connected pieces, rather than as an integral device, but in either event, there will be provided a unitary, rigid assembly.

Also, I believe that in some commercial embodiments of the device, the plug might be made only partially transparent, rather than wholly transparent. It is mainly important, in this regard, that a sufficient area of the plug be left transparent to enable the viewer to see inside the fitting.

The device, while particularly well adapted for use in observing the flow of steam condensate, can be utilized to advantage in observing the flow of any fluid which may exhibit a change of state.

The plug, as previously noted, is intended to show visibly whether or not a steam trap is functioning properly. Thus, when the trap is closed, the plug will contain no condensate. As soon as the trap begins to discharge, the plug will fog up, and the condensate will then enter the interior of the hollow body of the plug. When the trap shuts off, the condensate will drain out of said body and the wall of the body will become clear once again. Thus, there is a definitely visible, cyclic operation inherent in the plug design.

The plug will also detect faulty trap operation. Thus, a trap that is "blowing through" steam will cause the plug to continually fog up with steam vapor and condensate. A "cold trap," that is, one that is stopped up, will exhibit a static condition readily observed through the wall of the plug.

Preferably, the material of which the plug is formed will be any material suitable for steam service, such as glass, plastic, metal, etc., or combinations of these materials.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A test plug adapted for visual observation of the internal condition of a steam trap, comprising an upright, one piece, rigid assembly including a vertically extending body constant in diameter from end to end thereof, said body having a cylindrical side wall of constant thickness through its entire area, the body including planiform outer and inner end walls disposed normally to the longitudinal axis of the body, the outer end wall being wholly closed and the inner end wall having an opening concentric with the body and reduced substantially in diameter relative to the inner diameter of the body to define an internal shoulder surrounding said opening at the location of the inner end wall; and a tubular extension depending from said inner end wall and concentric with said opening, said tubular extension having a bore merging into the opening, the bore end opening being constant in diameter from end to end of the extension, said tubular extensions being threaded externally for its full length for engagement in the complementarily threaded plug-receiving opening of a steam trap, said extension being reduced in external diameter relative to the outer diameter of the body to define a circumferential, downwardly facing shoulder surrounding the extension at the lower end of the body, said last-named shoulder bearing against a portion of the steam trap surrounding the plug-receiving opening of said trap to tightly engage the plug against the trap.

References Cited in the file of this patent

UNITED STATES PATENTS

| Number | Name | Date |
|---|---|---|
| 1,753,508 | Garrett | Apr. 8, 1930 |

FOREIGN PATENTS

| Number | Country | Date |
|---|---|---|
| 472,134 | Great Britain | Sept. 17, 1937 |